(12) United States Patent
Morein (10) Patent No.: US 10,504,463 B2
(45) Date of Patent: Dec. 10, 2019

(54) DISPLAY PANEL WITH REDUCED SOURCE LINES

(71) Applicant: SYNAPTICS INCORPORATED, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/916,030

(22) Filed: Mar. 8, 2018

(65) Prior Publication Data

US 2018/0261171 A1 Sep. 13, 2018

Related U.S. Application Data

(60) Provisional application No. 62/470,648, filed on Mar. 13, 2017.

(51) Int. Cl.
*G09G 3/36* (2006.01)
*G06F 3/041* (2006.01)
*G06F 3/044* (2006.01)

(52) U.S. Cl.
CPC ........... *G09G 3/3607* (2013.01); *G06F 3/044* (2013.01); *G06F 3/0416* (2013.01); *G09G 3/3659* (2013.01); *G09G 3/3677* (2013.01); *G09G 2300/0426* (2013.01)

(58) Field of Classification Search
CPC ...... G09G 3/3607; G06F 3/0412; G06F 3/044
See application file for complete search history.

(56) References Cited

U.S. PATENT DOCUMENTS

| | | | |
|---|---|---|---|
| 8,970,537 | B1 | 3/2015 | Shepelev et al. |
| 9,543,023 | B2 | 1/2017 | Lai et al. |
| 9,552,089 | B2 | 1/2017 | Lukanc et al. |
| 2010/0194695 | A1 | 8/2010 | Hotelling et al. |
| 2013/0100039 | A1* | 4/2013 | Hong ............... B32B 37/1207 345/173 |
| 2014/0049508 | A1 | 2/2014 | Kim et al. |
| 2014/0125626 | A1 | 5/2014 | Yang et al. |
| 2015/0042600 | A1* | 2/2015 | Lukanc ............... G06F 3/0412 345/174 |

* cited by examiner

Primary Examiner — Kent W Chang
Assistant Examiner — Chayce R Bibbee
(74) Attorney, Agent, or Firm — Patterson + Sheridan, LLP (57) ABSTRACT

A system and method for updating a display panel having a plurality of display lines, a plurality of gate lines and a plurality of pixels. A first pixel pair of the pixels is coupled to at least three gate lines and two source lines. A display driver is coupled to the source lines, and is configured to drive the source lines to update the pixels.

20 Claims, 6 Drawing Sheets

DISPLAY PANEL WITH REDUCED SOURCE LINES

CROSS-REFERENCE TO RELATED APPLICATIONS

This application claims benefit of U.S. provisional patent application Ser. No. 62/470,648, filed Mar. 13, 2017, entitled "3/2 GATE PIXEL ARRANGEMENT FOR AN LCD PANEL", which is herein incorporated by reference in its entirety.

TECHNICAL FIELD

Embodiments of disclosure generally relate to electronic circuits and, more particularly, to a subpixel arrangement in a display panel.

BACKGROUND

In a display panel, source lines and gate lines are disposed on a glass substrate. In such a display panel, reducing the number of source lines reduces the number of source drivers within the corresponding display driver integrated circuit, resulting in lower fabrication cost the display driver integrated circuit. As the number of source lines is decreased, the number of gate lines and the rate at which the gate lines are selected must correspondingly be increased in order to maintain an acceptable image quality for the display panel. Since significant increases to the gate selection rate cannot be reliably made, reduction in the number of source lines is also limited, while limits the ability of to reduce display panel fabrication costs.

Thus, there is a need for an improved display panel.

SUMMARY

In one embodiment, a display panel comprises a plurality of source lines, a plurality of gate lines, and a plurality of pixels. The plurality of gate lines are disposed perpendicular to the plurality of source lines. The plurality of pixels is disposed in a plurality of rows and comprises a plurality of subpixels. A first pair of the pixels is connected to at least two source lines and three gate lines. The first pair comprises a first pixel disposed within a first row of the rows and a second pixel disposed along a second row of the rows adjacent to the first row.

In one embodiment, a display driver for a display device comprises a plurality of source drivers. The plurality of source drivers is configured to drive a plurality of pixels. A first source driver configured to drive a first source line to update a first pixel pair of the plurality of pixels, and a second source driver configured to drive a second source line to update the first pixel pair. A first pixel pair is coupled to a first gate line, a second gate line and a third gate line.

In one embodiment, a display device comprises a display panel and a display driver. The display panel comprises a plurality of source lines, plurality of gate lines, and a plurality of pixels. The plurality of pixels is disposed in a plurality of rows, and comprises a plurality of subpixels. A first pixel of the plurality of pixels is coupled to a first and second source line and a first, second, and third gate line. The display driver comprises a plurality of source drivers. A first source driver is configured to drive the first source line to update the first pixel pair, and the second source driver is configured to drive the second source line to update the first pixel pair.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 6 is a schematic block diagram of a sensor electrode pattern according to an embodiment To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

Figure 1:
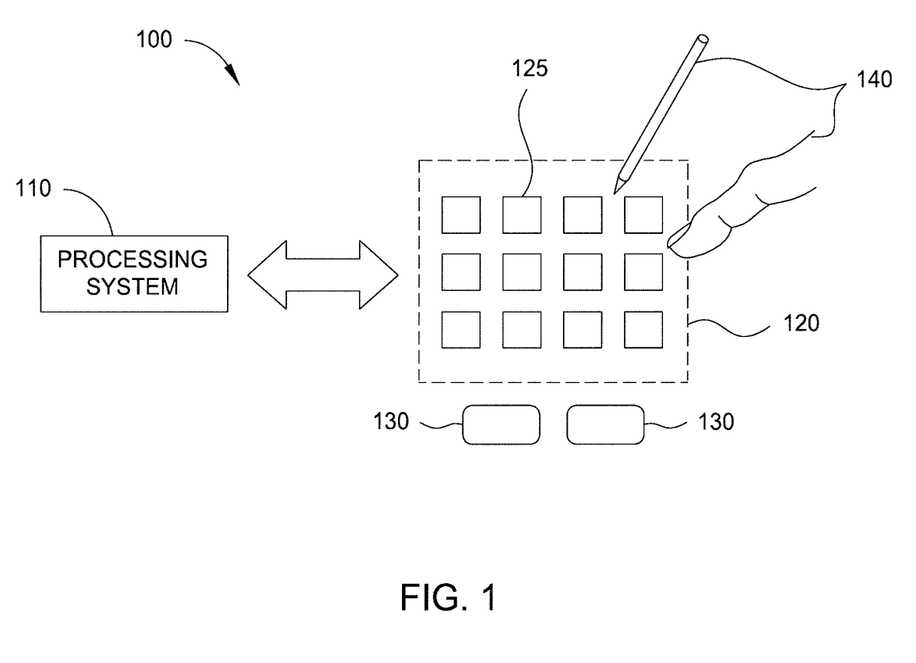
FIG. 1 is a schematic block diagram of an exemplary input device, according to one embodiment described herein.

FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of an electronic system include peripherals such as data input devices (including remote controls and mice), and data output devices (including display screens and printers). Other examples of an electronic system include remote terminals, kiosks, and video game machines (e.g., video game consoles, portable gaming devices, and the like). Other examples of an electronic system include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to the sensing element(s) of input device 100, and one or more components elsewhere. For example, the input device 100 may be a peripheral device coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. In yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
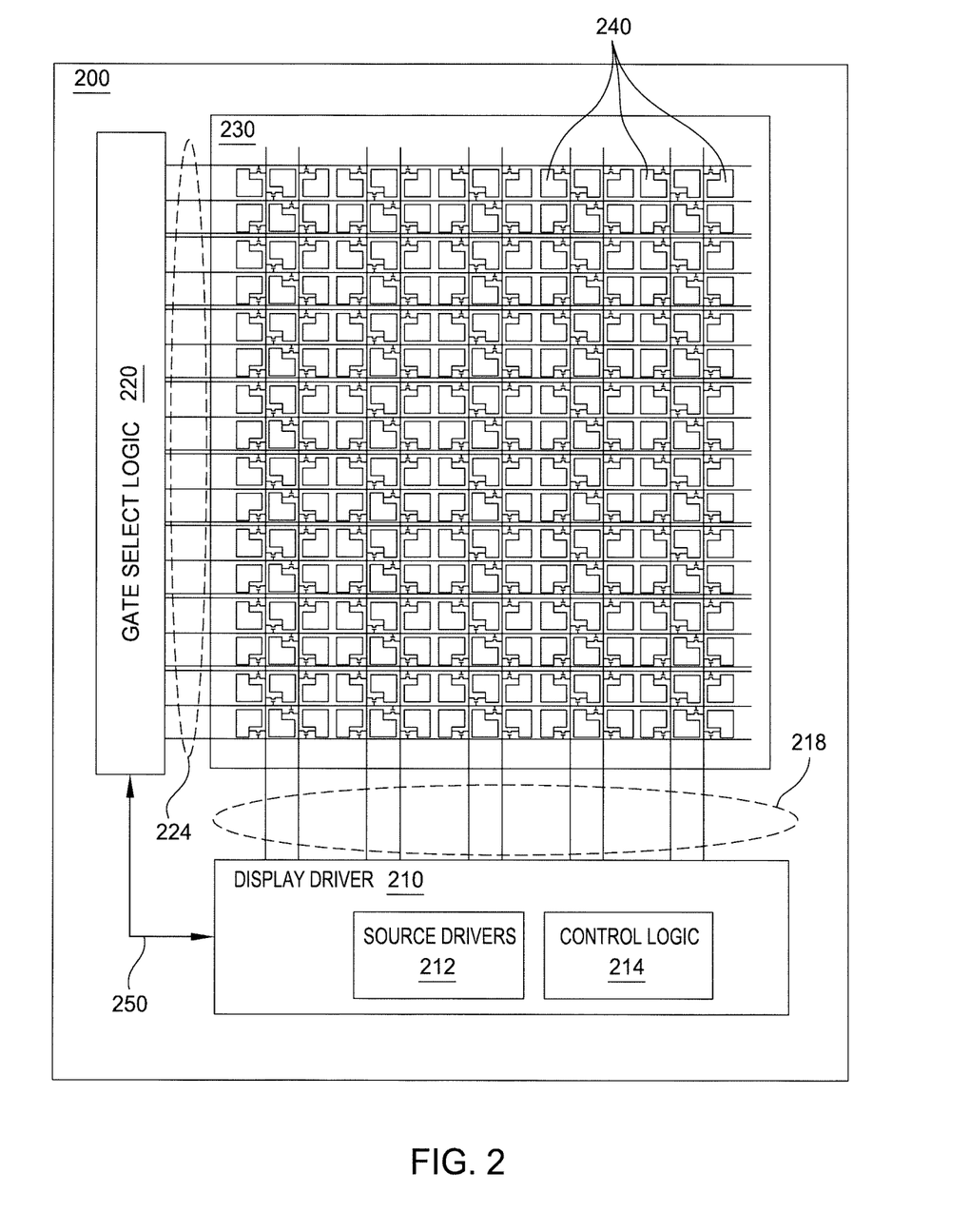
FIG. 2 is a schematic block diagram of a display device according to an embodiment.

FIG. 2 is a schematic diagram depicting one example of a display device 200 of the input device 100. The display device 200 includes a display panel 230, a gate select logic 220, and a display driver 210. In various embodiments, the gate lines may be referred to as gate electrodes and source lines may be referred to as source electrodes. Display driver 210 is configured to drive the pixels (and correspondingly, the subpixels) of the display panel 230 for updating and the gate select logic is configured to select gate lines to activate subpixels for updating.

Display panel 230 comprises subpixels 240, gate lines 224 and source lines 218. The subpixels 240 may include various types of subpixels and are grouped together to form pixels. For example, each pixel may include one of each type of subpixel. The subpixels 240 may include red subpixels, green subpixels, and blue subpixels. In yet other embodiments, the subpixels may include additional types of subpixels. For example, the subpixels 240 may include red subpixels, green subpixels, blue subpixels and white subpixels. In one embodiment, the display panel 230 may include 2160 source lines and 2880 gate lines. In another embodiment, the display panel 230 may include 1440 source lines and 1940 gate lines.

In one or more embodiments, the pixels are disposed in a plurality of rows and/or columns. The rows of pixels may be referred to as pixel rows and/or display lines. In one embodiment, each row of pixels is parallel to another row of pixels. Further, a first pixel row and its corresponding pixels are adjacent to a second pixel row and its corresponding pixels. In one or more embodiments, each pixel has the same number of subpixels. In other embodiments, at least one pixel has a different number of subpixels than another pixel. In one embodiment, a pixel may be comprised of subpixels disposed in more than one row.

Figure 3A:
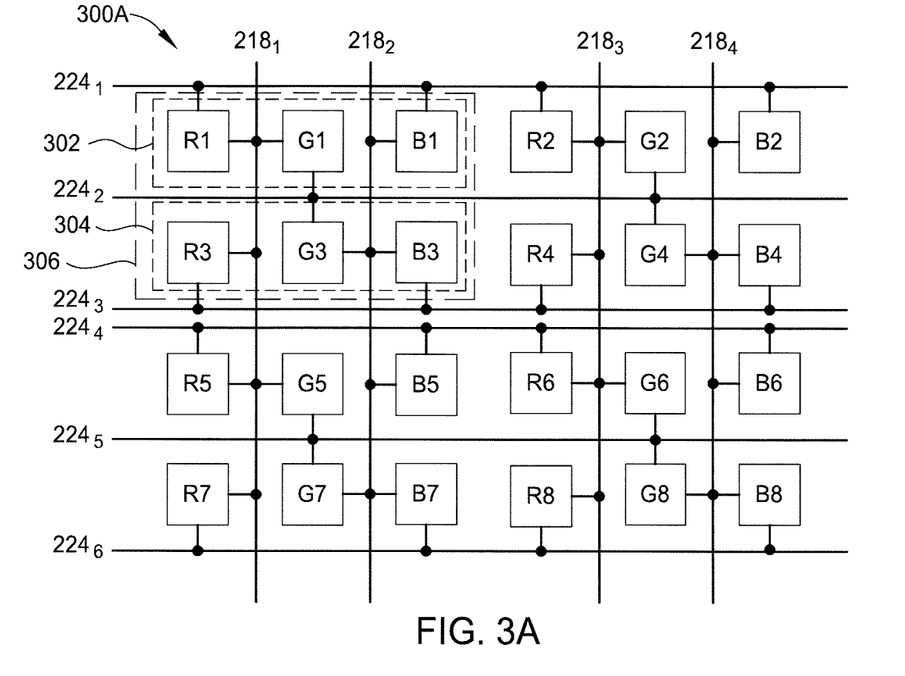
FIGS. 3A and 3B are schematic block diagrams of a portion of a display panel according to an embodiment.

FIG. 3A illustrates a portion 300a of the display panel 230. FIG. 3A further illustrates a portion of subpixels 240, gate lines 224, and source lines 218. As illustrated gate lines 224 includes gate lines $224_1$-$224_6$, and source lines 218 include source lines $218_1$-$218_4$. Further, subpixels 240 include subpixels red subpixels R1-R8, green subpixels G1-G8, and blue subpixels B1-B8. The subpixels are grouped into rows and columns corresponding to gate lines and source lines. To update the display panel 230, the subpixels are driven by selecting subpixels by driving gate lines and then driving corresponding source lines with data signals.

In various embodiments, reducing the number of source lines beneficially decreases the cost a display driver integrated circuit for the display panel 230. For example, as source drivers are implemented within the display driver integrated circuit, reducing the number of source lines reduces the cost of the cost of the display driver integrated circuit, and consequently, the bill of material costs of a display device is also reduced. However, it is often necessary to ensure that each subpixel is individually addressable, and in embodiments having a reduced number of source lines, subpixels of a common row are coupled to two or more gate lines. Further, in such embodiments, the gate lines are driven at an increased selection rate as compared display devices having larger number of gate lines. For example, if a row of subpixels are divided between two gate lines for selection, each gate line is driven twice as fast as a gate line of a conventional display panel having a single gate line coupled to each subpixel of a row. However, in some display panels, the switching electronics do not support the increased selection rate of the gate lines.

A display panel having a decreased number of source lines and an increased number of gates lines is referred to as a "dual-gate" display panel, in which the number of source lines is reduced by half and the number of gate lines is doubled. A dual-gate subpixel arrangement is an example of one method for reducing the cost of an LCD panel by doubling the number of gates lines and halving the number of source lines as compared to conventional display panels having one gate line per row of pixels. Further, in a dual-gate arrangement, two gate lines are in every channel between pixel rows, while source lines are shared between pixel columns. Since the each source line is driven by a corresponding source driver of a display driver integrated circuit, reducing the number of source lines also beneficially reduces the number of source drivers of the display driver integrated circuit, reducing the cost of the display driver integrated circuit and the corresponding display device.

Figure 3B:
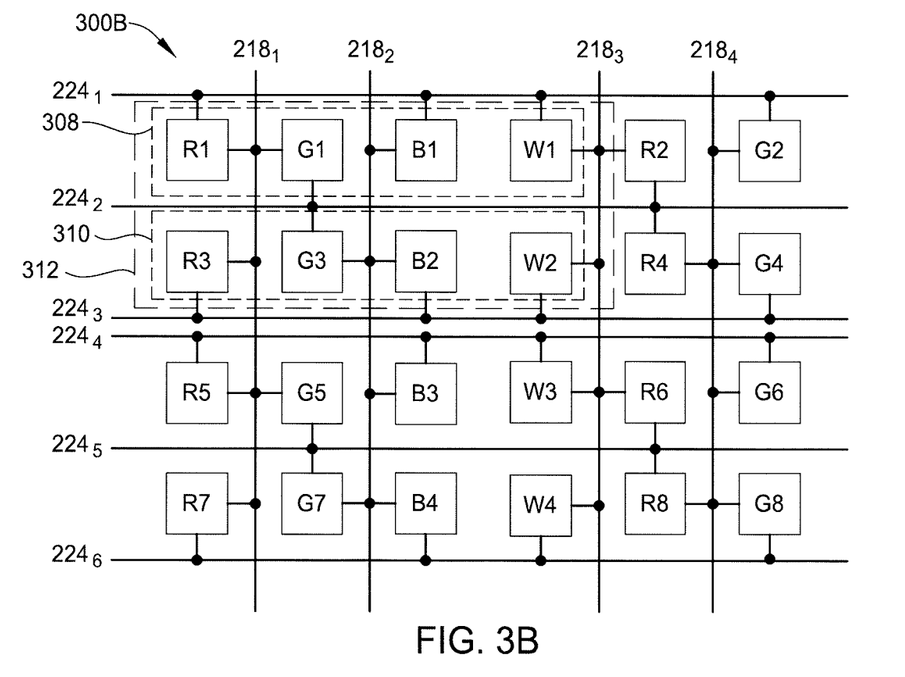

However, in various embodiments, display panels are not able to support the increased activation rates required by display panels implemented in dual gate arrangements. For example, display panels having a portrait orientation have a larger number of gate lines as compared to display panels having a landscape orientation. In such embodiments, the corresponding switching electronics (e.g., transistors) may not support the increased switching times required by display panels implementing dual-gate arrangements. Further, slower display types (e.g., Low Temperature Polycrystalline Silicon (LTPS)) also may not support being driven fast enough to support display panels implementing dual-gate arrangements. Other pixel arrangements may be employed to reduce the source lines and decrease the cost of the display driver integrated circuit. For example, as illustrated by the embodiments in FIG. 2 and FIG. 3A, three gate lines and two source lines may be used to update six subpixels. Such an arrangement may be referred to as a 3/2 gate-line arrangement. FIG. 3B illustrates an alternative embodiment, where three source lines and three gate lines are used to update a pixel having four subpixels.

While the portion 300a shows a particular layout of subpixels, the subpixels can be in other arrangements (e.g., GRB, BGR, RBG, etc.). In various embodiments, the placement of subpixel types may be varied across the display panel. Further, the subpixels can be associated with colors, alternative to or in addition to, red, green, and blue. In the portion 300a of the display panel 230 depicted in FIG. 3B, the number of source lines is reduced without increasing the number of gate lines by an amount that makes the gate line selection timing unfeasible.

In one embodiment, a first gate line is coupled to a first subpixel of a first type, and a first subpixel of a third type, a second gate line is coupled to a first and second subpixel of a second type, and a third gate line is coupled to a second subpixel of the first type and a second subpixel of the third type. Further, a first source is coupled to the first and second subpixels of the first type, and the first subpixel of the second type, and a second source line is coupled to the second subpixel of the second type and a first and second subpixel of the third type.

FIG. 3A illustrates subpixels R1, B1, R2, and B2 coupled to gate line $224_1$, subpixels G1, G2, G3, and G4 coupled to gate line $224_2$, and subpixels R3, B3, R4 and B4 coupled to gate line $224_3$. Further, subpixels R1, R3, and G1 are coupled to source line $218_1$, subpixels B1, B3 and G3 are coupled to source line $218_2$, subpixels R2, R4, and G2 are coupled to source line $218_3$, and subpixels B2, B4 and G4 are coupled to source line $218_4$. Further, subpixels R5, B5, R6, and B6 are coupled to gate line $224_4$, subpixels G5, G6, G7, and G8 coupled to gate line $224_4$, and subpixels R7, B7, R8 and B8 are coupled to gate line $224_4$. Additionally, as illustrated subpixels R4, R5, and G5 are coupled to source line $218_1$, subpixels B5, B7 and G7 are coupled to source line $218_2$, subpixels R8, R8, and G6 are coupled to source line $218_3$, and subpixels B6, B8, and G8 are coupled to source line $218_4$.

In an embodiment, the portion 300a includes a 3/2 pixel arrangement, where the number of source lines is decreased by ⅓ and the number of gate lines is increased by 50% to 3/2, as compared to a conventional display panel where source lines are not shared between subpixels of different columns. In particular, each pair of pixels in a given column is coupled to two source lines and three gate lines. For example, consider the pixel pair 306 comprising pixel 302 and 304, which is coupled to source lines $218_1$ and $218_2$ and gate lines $224_1$, $224_2$, and $224_3$. The source line $218_1$ is coupled to both the subpixels R1 and G1 of pixel 302, and to the subpixel R3 of pixel 304. The source line $218_2$ is coupled to subpixel B1 in pixel 302, and to both the subpixels G3 and B3 in pixel 304. Further, the gate line $224_1$ is coupled to the subpixels R1 and B1 of pixel 302. The gate line $224_2$ is coupled to the subpixels G1 and G3 of pixels 302 and 304, respectively. The gate line $224_3$ is coupled to the subpixels R3 and B3 in the pair of pixels 302, 304. This arrangement is repeated for each pair of pixels in a given column and for each column of display panel 230.

While not illustrated in FIG. 3A, the subpixels may be coupled to corresponding gate lines and source lines via transistors (e.g., thin-film transistors), as illustrated in FIG. 2. In one embodiment, each gate line is coupled to the gate of the transistor to turn the transistor on and off, selecting and deselecting each subpixel. Source lines are coupled to sources of the transistors to supply source data (e.g., a voltage signal). The source lines may be grouped and coupled to multiplexers, such that more than one source line may be coupled to a common source driver. For example, two or more source lines configured to driver subpixels of a common type may be coupled to a multiplexer and a common source driver.

FIG. 3B illustrates portion 300B having pixel pair 312 which includes pixels 308 and 310. As compared to the embodiment of FIG. 3A, the pixels of FIG. 3B includes four subpixel types, red subpixels, green subpixels, blue subpixels, and white subpixels. In other embodiments, instead of a white subpixel, a second green subpixel or a yellow subpixel may be included within each pixel.

In the illustrated embodiment, pixel 308 is coupled to source lines $218_1$, $218_2$ and $218_3$ and gate lines $224_1$ and $224_2$. Pixel 310 is coupled to source lines $218_1$, $218_2$ and $218_3$ and gate lines $224_2$ and $224_3$. Further, pixel 308 includes subpixels R1, G1, B1 and W1 and pixel 310 includes subpixels R3, G3, B2 and W2. Subpixels R1, R3, and G1 are coupled to source line $218_1$, B1, B2, and G3 are coupled to source line $218_2$, and W1 and W2 are coupled to source line $218_3$. Additionally, subpixels R1, B1 and W1 are coupled to gate line $224_1$, subpixels G1 and G3 are coupled to gate line $224_2$, and subpixels $R_3$, $B_2$ and $W_2$ are coupled to gate line $224_3$.

Gate select logic 220 is coupled to the gate lines 224, and configured to drive the gate lines with gate select voltages to select subpixels for display updating. In one embodiment, gate select logic 220 is configured to drive a gate high voltage (Vgh) to select a gate line and corresponding subpixels for display updating and a low high voltage (Vgl) to deselect a gate line and corresponding subpixels for updating. Vgh may be at a higher voltage than Vgl. In one embodiment, Vgh may be 15 volts and Vgl may be −5 volts. In other embodiments, other voltages may be used.

In one embodiment, the gate select logic 220 activates a single gate line at a time for updating. In other embodiments, the gate select logic 220 simultaneously activates two more gate lines at a time. Further, the gate select logic 220 may be configured to activate more than two gate lines at a time such that one gate line is activated during a period of time that at least partially overlaps with a time when a second gate line is activated. For example, a first gate line may be activated during a first period, a second gate line may be activated during a second period and a third gate line may be active during a third period. The first, second and third periods may be substantially equal in duration, but are initiated at different times. Specifically, the first gate line may be activated before the second gate line and the second gate line may be activated before the third gate line. Each gate line may be activated during at least partially overlapping periods of time. Such an embodiment may be used in displays where the subpixel circuitry is slow to respond to selection voltages and may be referred to "pipelining". For example, in display panels where the transistors coupled to the subpixels are slow to turn on (activate), a gate line may begin to drive corresponding transistors before the corresponding subpixels are updated, such that the transistors are able to reach their turn on voltage by the time the subpixels are scheduled to be updated.

Display driver 210 is coupled to source lines 218 and comprises source drivers 212. In one embodiment, display driver 210 may also include control logic 214. While not illustrated, display driver 210 may additionally include one or more memory elements and additional circuitry.

The source drivers 212 of display driver 210 are configured to drive subpixels 224 via source lines 218. Each source driver may be coupled to a respective one of the source lines, or each source driver may be coupled to multiple source lines through a multiplexer. In one embodiment, source drivers 212 are configured to drive source data on the source lines to update the subpixels. Each source driver may comprise circuitry configured to drive voltages onto the source lines. In one embodiment, the source drivers comprise one or more amplifiers and multiplexers. The source drivers may be configured to drive source data signals onto the subpixels to charge the subpixel to a particular voltage with reference to a common voltage on a common voltage electrode (not illustrated). Each source driver is coupled to a separate one of the source lines and is configured to update the subpixels coupled to that source line.

Display driver 210 also includes control logic 214 configured to communicate with gate select logic 220 via communication path 250. In one embodiment, the control logic 214 is configured to provide an indication to gate select logic 220 when to begin activating gate lines for display updating. Further, in one or more embodiments, the control logic 214 is configured to provide a clock signal to gate select logic 220. In yet other embodiments, the control logic 214 may provide one or more control signals to pause selection of gate lines, restart selection of the gate lines, and/or which gate lines to select.

Display driver 210 may be communicatively coupled to an external computing device (e.g., a host device, a timing controller, or the like). The display driver 210 may receive display data from the external computing device and process the display data to drive the subpixels. Further, the display driver 210 may be part of processing system 110 or separate from processing system 110. In various embodiments, the display driver 210 is part of a single integrated circuit or part of multiple integrated circuits.

The display driver 210 may be configured to determine source data to be driven onto each source line to update corresponding subpixels based on display data. Further, as each of the source lines are coupled to multiple subpixels within each row of subpixels, the display driver 210 may use the timing used by gate select logic 220 to activate or select the gate lines to determine the source data to drive on each source line.

With further reference to FIGS. 2 and 3A, in one embodiment, the gate select logic 220 activates gate line $224_1$ to select subpixels R1, R2, B1 and B2 for updating. A first source driver of source drivers 212 drives source line $218_1$ with source data to update subpixel R1, source line $218_2$ with source data to update subpixel B1, source line $218_3$ with source data to update subpixel R2, and source line $218_4$ with source data to update subpixel B2. In one embodiment, the source data corresponds to a voltage level to be driven on each subpixel. The voltage level may set a voltage difference between each subpixel and a common voltage on a common voltage electrode, and define a property of a corresponding liquid crystal material. By varying the voltage difference between each subpixel and the common voltage electrode, the brightness of each subpixel and color of each corresponding pixel may be determined.

Gate line $224_2$ may be activated after gate line $224_1$ to select subpixels G1, G2, G3 and G4 for updating. Accordingly, source drivers coupled to source lines $218_1$-$218_4$ are driven with corresponding source data to update these subpixels. Specifically, source line $218_1$ is driven to update subpixel G1, source line $218_2$ is driven to update subpixel G3, source lines $218_3$ is driven to update subpixel G2 and source lines $218_4$ is driven to update subpixel G4. As is illustrated, each of the subpixels G1-G4 shares a source line with one other type of subpixel. For example, subpixel G1 and subpixel R1 are coupled to a common source line. Further, gate line $224_3$ is activated to select subpixels R3, R4, B3 and B4 for updating. The source drivers coupled to source lines $218_1$-$218_4$ drive each corresponding source line with source data to update the selected subpixels. In one embodiment, a first source driver drives source line $218_1$ with source data to update subpixel R3, a second source driver drives source line $218_2$ with source data to update subpixel B3, a third source driver drives source line $218_3$ with source data to update subpixel R4, and a fourth source driver drives source line $218_4$ with source data to update subpixel B4. As can be seen, to update two rows of subpixels (e.g., display lines), three different gate lines are activated.

With reference to FIG. 3B, the gate select logic 220 activates gate line $224_1$ to select subpixels R1, R2, B1 and W1 for updating. A first source driver of source drivers 212 drives source line $218_1$ with source data to update subpixel R1, source line $218_2$ with source data to update subpixel B1, source line $218_3$ with source data to update subpixel W1.

Gate line $224_2$ may be activated after gate line $224_1$ to select subpixels G1, and G2 for updating. Accordingly, source drivers coupled to source lines $218_1$-$218_2$ are driven with corresponding source data to update these subpixels. Specifically, source line $218_1$ is driven to update subpixel G1, source line $218_2$ is driven to update subpixel G3. For example, subpixel G1 and subpixel R1 are coupled to a common source line. Further, gate line $224_3$ is activated to select subpixels R3, R4, B3 and B4 for updating. The source drivers coupled to source lines $218_1$-$218_3$ drive each corresponding source line with source data to update the selected subpixels. In one embodiment, a first source driver drives source line $218_1$ with source data to update subpixel R3, a second source driver drives source line $218_2$ with source data to update subpixel B2, a third source driver drives source line $218_3$ with source data to update subpixel W1. As can be seen, to update two rows of subpixels (e.g., display lines), three different gate lines are activated.

Figure 4:
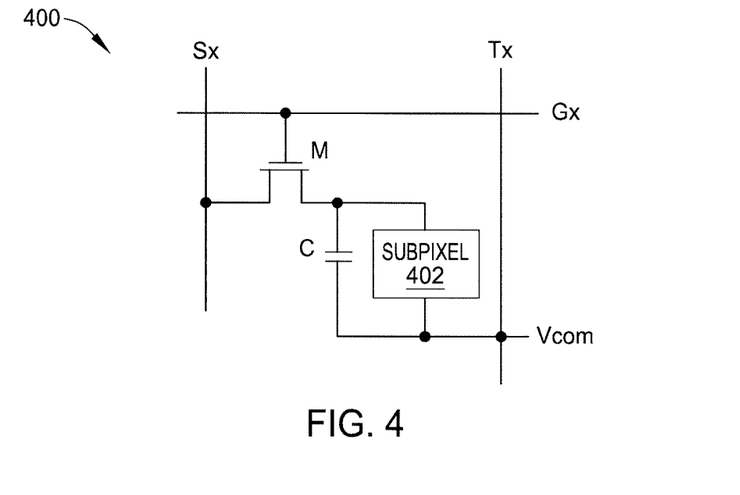
FIG. 4 is a schematic diagram of a subpixel circuit structure according to an embodiment.

FIG. 4 a schematic diagram of a subpixel circuit structure 400 according to an embodiment. The circuit structure 400 includes a transistor M, a capacitor C, and a subpixel 402. The transistor M is a field effect transistor (FET) having a gate coupled to a gate line Gx, a source coupled to a source line Sx, and a drain coupled to the subpixel 402. The capacitor C, and the subpixel 402, are coupled between the drain of the transistor M and an electrode (Vcom). In an embodiment, a routing trace Tx for a capacitive sensing device can be coupled to the Vcom electrode. In another embodiment, the touch sensor line Tx can be coupled to a dedicated sensor electrode (not shown).

Figure 5:
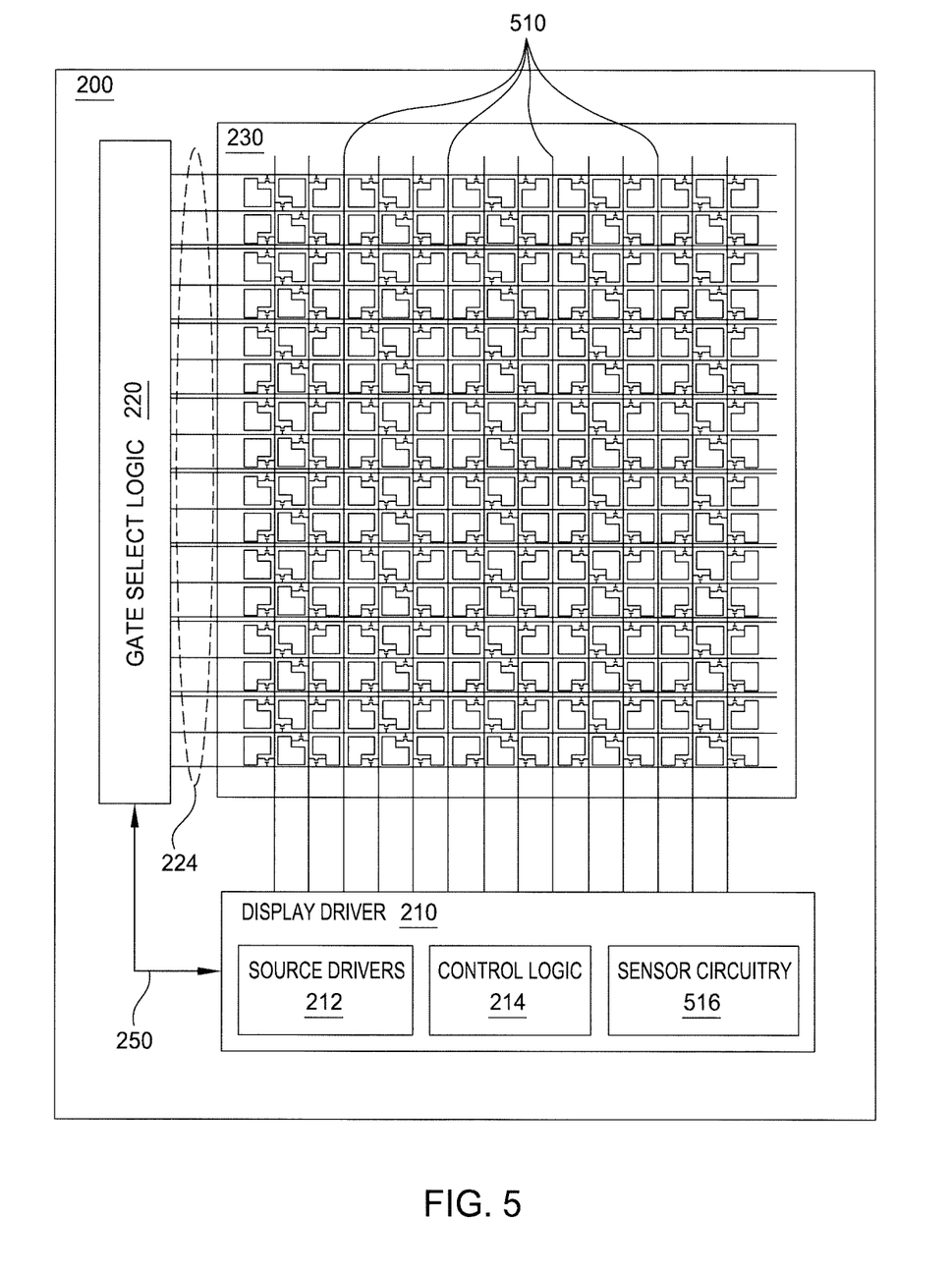
FIG. 5 is a schematic block diagram of a display device according to an embodiment.

As illustrated by FIG. 5, reducing the number of source lines creates areas within the display panel that are free of source lines. In one or more embodiments, routing traces for a sensing device may be disposed within these areas. As these areas are spaced apart from source lines, the capacitive coupling between the source lines and routing traces may be minimized. In some embodiments, a routing trace may be disposed within each of the areas free from source lines. In other embodiments, routing traces are only disposed in a portion of the areas free from source lines. Further, the routing traces may be disposed below and aligned with a black mask channel of a black mask layer of the display panel. By disposing the routing traces below a corresponding black mask channel, the routing traces are hidden from a user and possible adverse effects on the display are at least minimized.

In various embodiments, routing traces 510 may be routed in areas between subpixels that are free from source lines. While not illustrated, each routing trace may be coupled to a sensor electrode. Further, while each routing trace is illustrated as spanning similar distance across display panel 230, in other embodiments, one or more routing traces may span different distances across the display panel 230.

Display driver 210 may be coupled to routing traces 510. In the illustrated embodiment, display driver 210 includes sensor circuitry 516 configured to drive sensing signals onto routing traces 510 to drive sensor electrodes. Further, while only four routing traces are illustrated, in various embodiments, more than four routing traces may be included. In some embodiments, the number of routing traces may be equal to the number of sensor electrodes (not illustrated). For example, the number of routing traces may be in the hundreds.

In various embodiments, sensor circuitry 516 may be separate from display driver 210. In such an embodiment, the sensor circuitry 516 may be included within a separate integrated circuit from that of source drivers 212. Further, the sensor circuitry 516 may be included in processing system 110 or another processing system of an external computing device.

Figure 6:
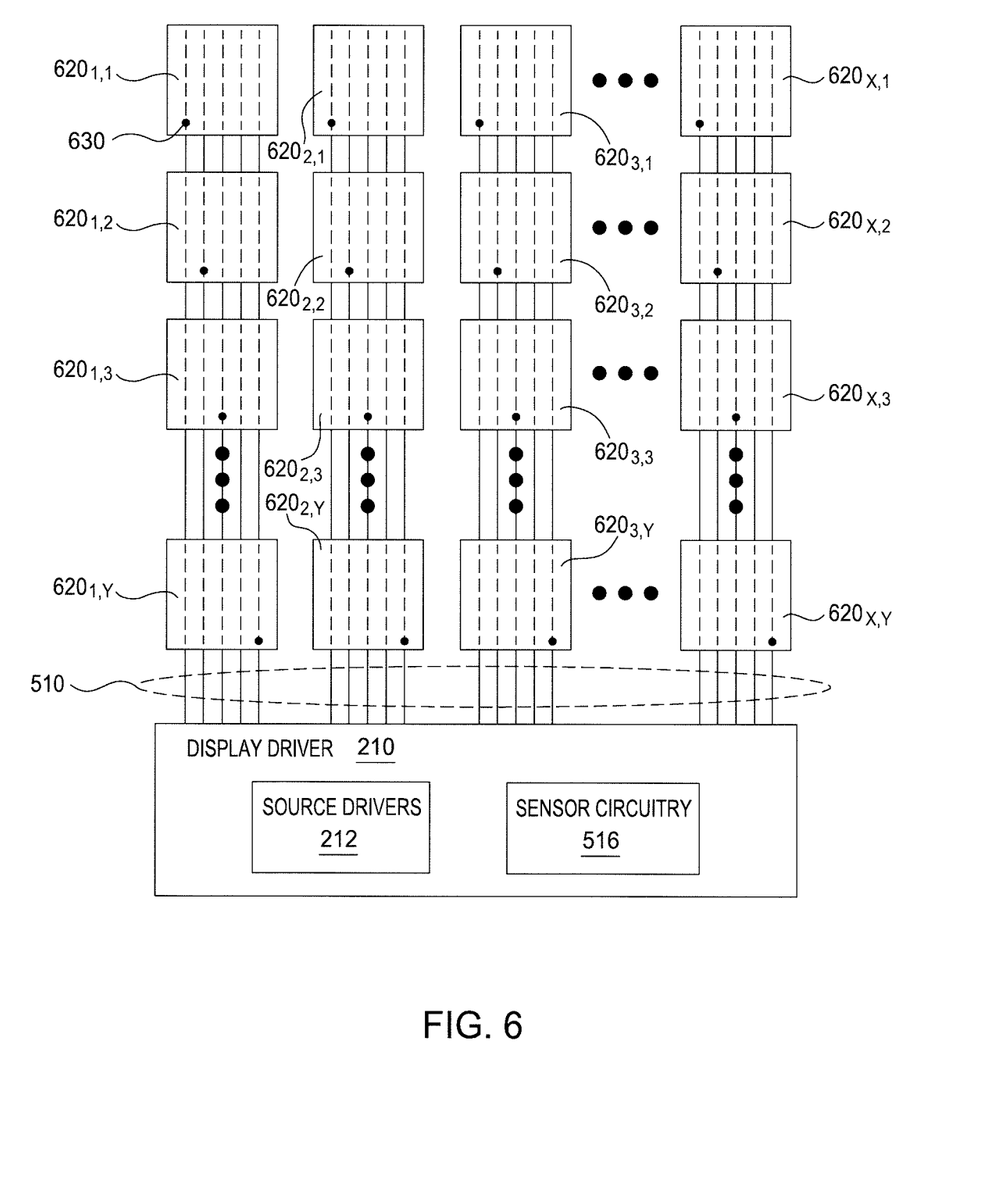

FIG. 6 shows a portion of an exemplary pattern of sensing electrodes 620 configured to sense in a sensing region 120 associated with a pattern, according to some embodiments. Each sensing electrode 620 may include one of more of the sensing elements described above. For clarity of illustration and description, FIG. 6 presents sensor electrodes in a pattern of simple rectangles and does not show various other components. In one embodiment, each sensor electrode spans the distance across the sensing region. Further, the sensor electrodes may be disposed on a common layer, or one or more sensor electrodes may be disposed on first layer and one or more sensor electrodes may be disposed on a second layer. In one embodiment, a first plurality of the sensor electrodes overlaps a second plurality of the sensor electrodes.

In various embodiments, each individual sensor electrodes 620 or multiple sensor electrodes 620 form areas of localized capacitance (capacitive coupling). The areas of localized capacitance may be formed between an individual sensor electrode and ground in a first mode of operation and between groups of sensor electrodes used as transmitter and receiver electrodes in a second mode of operation. The capacitive coupling changes with proximity and motion of one or more input objects in the sensing region 120 associated with the sensor electrodes 620, and thus may be used as an indicator of the presence of the input object in the sensing region 120 of the input device.

The exemplary pattern comprises an array of sensor electrodes arranged in X columns and Y rows in a common plane, wherein X and Y are positive integers, although one of X and Y may be zero. It is contemplated that the pattern of sensor electrodes 620 may comprise a plurality of sensor electrodes 620 having other configurations, such as polar arrays, repeating patterns, non-repeating patterns, non-uniform arrays, a single row or column, or other suitable arrangement. Further, as will be discussed in more detail below, the sensor electrodes 620 may be any shape such as circular, rectangular, diamond, star, square, noncovex, convex, nonconcave concave, etc. As shown here, the sensor electrodes 620 are coupled to the display driver 210 comprising sensor circuitry 516. In other embodiments, sensor circuitry 516 may be separate from display driver 210 and coupled with the sensor electrodes. Each sensor electrode may overlap multiple subpixels.

Each sensor electrode is coupled to display driver 210 with a respective one of the routing traces 510. The routing traces 510 may be disposed on a layer below the sensor electrodes 620. For example, the routing traces 510 may be disposed within a metal layer of the display panel 230. The metal layer may be the same metal layer as source lines 218 or a different metal layer from that of source lines 218. In one embodiment, as described above, the routing traces may be disposed between subpixels of the display panel 230 and aligned with a black mask of the display panel. Each sensor electrode may be coupled with a respective one of the routing traces through a via (e.g., via 630). While only a single via is shown coupling each sensor electrode with a routing trace, in other embodiments, multiple vias may be employed. Further, the vias may be disposed within each sensor electrode at a similar location.

In a first mode of operation, at least one sensor electrode within the sensor electrodes 620 may be utilized to detect the presence of an input object via absolute capacitive sensing techniques. Sensor circuitry 516 is configured to drive a sensor electrode using a routing trace 510 with a modulated signal (i.e., a capacitive sensing signal) and measure a capacitance between the sensor electrode and the input object (e.g., free space or earth ground) based on the modulated signal, which is utilized to determine the position of the input object.

The various electrodes of sensor electrodes 620 are typically ohmically isolated from the electrodes of other sensor electrodes 620. That is, one or more insulators separate the sensor electrodes and prevent them from electrically shorting to each other.

In a second mode of operation, sensor electrodes in the sensor electrodes 620 are utilized to detect the presence of an input object via transcapacitance sensing techniques. That is, sensor circuitry 516 drives at least one sensor electrode with a transmitter signal and receive resulting signals using one or more of the other sensor electrodes, where a resulting signal comprising effects corresponding to the transmitter signal. The resulting signal is utilized to determine the position of the input object.

The input device 100 comprising sensor electrodes 620 may be configured to operate in any one of the modes described above. The input device 100 may also be configured to switch between any two or more of the modes described above.

In some embodiments, the sensor electrodes 620 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the sensor electrodes 620.

In other embodiments, "scanning" to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple sensor electrodes 620 at the same time. In such embodiments, an absolute capacitive measurement may be obtained from each of the one or more sensor electrodes simultaneously. In one embodiment, sensor circuitry 516 simultaneously drives a sensor electrode in a plurality of sensor electrodes 620 and measures an absolute capacitive measurement for each of the sensor electrodes 620 in the same sensing cycle. In various embodiments, sensor circuitry 516 may be configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the sensor electrodes 620 form a capacitive image (also capacitive frame) where each pixel of the capacitive image is representative of the capacitive couplings as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the sensor electrodes 620 include one or more display electrodes used in updating the display of the display panel (e.g., display panel 230). In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

In one embodiment the sensor circuitry 516 comprises circuitry configured to drive a transmitter signal or a modulated signal onto and receive resulting signals with the sensing electrodes during periods in which input sensing is desired. In one embodiment the sensor circuitry 516 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor circuitry 516 may be selectively coupled to one or more of the sensor electrodes in the sensor electrodes 620. For example, the sensor circuitry 516 may be coupled to selected portions of the sensor electrodes and operate in either an absolute or transcapacitance sensing mode. In another example, the sensor circuitry 516 may be coupled to different sensor electrodes when operating in the absolute sensing mode than when operating in the transcapacitance sensing mode.

In various embodiments the sensor circuitry 516 may comprise receiver circuitry configured to receive a resulting signal with the sensing electrodes comprising effects corresponding to the transmitter signal during periods in which input sensing is desired. In one or more embodiments, the receiver circuitry is configured to drive a modulated signal onto a first sensor electrode and receive a resulting signal corresponding to the modulated signal to determine changes in absolute capacitance of the sensor electrode. The receiver circuitry may determine a position of the input object in the sensing region 120 or may provide a signal including information indicative of the resulting signal to another module or processor, for example, a determiner of the display driver 210 or another processing system (e.g., processing system 110) or a processor of the electronic device (i.e., a host processor), for determining the position of the input object in the sensing region 120. In one or more embodiments, the receiver circuitry comprises a plurality of receivers, where each receiver may be an analog front ends (AFEs).

The embodiments and examples set forth herein were presented to explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A display panel comprising:
   a plurality of source lines;
   a plurality of gate lines disposed perpendicular to the plurality of source lines; and
   a plurality of pixels disposed in a plurality of rows and comprising a plurality of subpixels, wherein a first pair of the plurality of pixels is connected to at least two source lines of the plurality of sources line and comprises a first pixel disposed within a first row of the rows and a second pixel disposed within a second row of the rows adjacent to the first row, and wherein:
   a first gate line of the plurality of gate lines is coupled to a subpixel of a first type of the first pixel and a subpixel of a third type of the first pixel;
   a second gate line of the plurality of gate lines is coupled to a subpixel of a second type of the first pixel and a subpixel of the second type of the second pixel; and
   a third gate line of the plurality of gate lines is coupled to a subpixel of the first type of the second pixel and a subpixel of the third type of the second pixel.

2. The display panel of claim 1, wherein the first pair is further coupled to a third source line of the source lines.

3. The display panel of claim 1, wherein a first source line of the at least two source lines is coupled to the subpixel of the first type of the first pixel, the subpixel of the first type of the second pixel, and the subpixel of the second type of the first pixel; and
   a second source line of the at least two source lines is coupled to the subpixel of the second type of the second pixel, the subpixel of the third type of the first pixel, and the subpixel of the third type of the second pixel.

4. The display panel of claim 3, wherein the first pixel further comprises a first subpixel of a fourth type, and the second pixel further comprises a second subpixel of the fourth type, the first subpixel of the fourth type is coupled to the first gate line and a third source line of the plurality of source lines and the second subpixel of the fourth type is coupled to the second gate line and the third source line.

5. The display panel of claim 1, wherein a second pair of the plurality of pixels is coupled to the first gate line, the second gate line, and the third gate line, and a second at least two source lines of the plurality of source lines.

6. The display panel of claim 1, wherein a third pair of the plurality of pixels is coupled to a fourth gate line of the plurality of gate lines, a fifth gate line of the plurality of gate lines and a sixth gate line of the plurality of gate lines, and the at least two source lines.

7. The display panel of claim 1, further comprising:
   gate line control logic coupled to the plurality of gate lines, and configured to drive the plurality of gate lines to update the pixels; and
   a display driver coupled to the plurality of source lines and configured to drive the plurality of source lines to update the pixels.

8. The display panel of claim 1, further comprising:
   a plurality of sensor electrodes; and
   a plurality of routing traces coupled to the plurality of sensor electrodes, wherein a first routing trace of the plurality of routing trace is disposed between two source lines of the source lines.

9. The display panel of claim 8, wherein each of the plurality of routing traces is disposed below a black mask layer.

10. The display panel of claim 4, wherein a subpixel of the first type of a third pixel is coupled to the third source line and the second gate line and a subpixel of the first type of a fourth pixel is coupled to the second gate line and fourth source line of the plurality of source lines.

11. A display driver for a display device, the display driver comprising:
    a plurality of source drivers configured to drive a plurality of pixels, the plurality of source drivers comprising:
    a first source driver configured to drive a first source line of a plurality of source lines to update a first pixel pair of the plurality of pixels, and
    a second source driver configured to drive a second source line of the plurality of source lines to update the first pixel pair, wherein the first pixel pair comprises a first pixel and a second pixel, and wherein:
    a subpixel of a first type of the first pixel and a subpixel of a third type of the first pixel are coupled to a first gate line of a plurality of gate lines;
    a subpixel of a second type of the first pixel and a subpixel of the second type of the second pixel are coupled to a second gate line of the plurality of gate lines; and
    a subpixel of the first type of the second pixel and a subpixel of the third type of the second pixel are coupled to a third gate line of the plurality of gate lines.

12. The display driver of claim 11, wherein the plurality of source drivers further comprises a third source driver configured to drive a third source line to update the first pixel pair.

13. The display driver of claim 11, wherein the first source driver is further configured to drive the first source line to update a second pixel pair of the plurality of pixels, and the second source driver is further configured to drive the second source line to update the second pixel pair, the second pixel pair is coupled to a fourth gate line, a fifth gate line and a sixth gate line of the plurality of gate lines.

14. The display driver of claim 11, wherein the plurality of source drivers further comprises a fourth source driver configured to drive a fourth source line of the plurality of source lines to update a third pixel pair of the plurality of pixels, and a fifth source driver to drive a fifth source line of the plurality of source lines to update the third pixel pair.

15. The display driver of claim 11, further comprising sensor circuitry configured to drive a plurality of sensor electrodes for capacitive sensing.

16. A display device comprising:
   a display panel comprising:
      a plurality of source lines;
      a plurality of gate lines; and
      a plurality of pixels disposed in a plurality of rows and comprising a plurality of subpixels, wherein a first pixel pair of the plurality of pixels comprises a first pixel and a second pixel and is coupled to a first and second source line of the plurality of source lines and wherein a first gate line of the plurality of gate lines is coupled to a subpixel of a first type of the first pixel and a subpixel of a third type of the first pixel, a second gate line of the plurality of gate lines is coupled to a subpixel of a second type of the first pixel and a subpixel of the second type of the second pixel, and a third gate line of the plurality of gate lines is coupled to a subpixel of the first type of the second pixel and a subpixel of the third type of the second pixel; and
   a display driver comprising:
      a plurality of source drivers comprising:
         a first source driver configured to drive the first source line to update the first pixel pair; and
         a second source driver configured to drive the second source line of the source lines to update the first pixel pair.

17. The display device of claim 16, further comprising gate line select logic coupled the plurality of gate lines, the gate line select logic is configured to:
   drive the first gate line to select the subpixel of the first type and subpixel of the third type of the first pixel;
   drive the second gate line to select a first the subpixel of the second type of the first pixel and the subpixel the second type of the second pixel; and
   drive the third gate line to select the subpixel of the first type of the second pixel and the subpixel of the third type of the second pixel.

18. The display device of claim 16, wherein the first pixel pair is further coupled to a third source line of the plurality of source lines, and the display driver further comprises a third source driver configured to drive the third source line to update the first pixel pair.

19. The display device of claim 16, wherein a second pixel pair of the plurality of pixels is coupled to the first and second source lines, and a fourth, fifth and sixth gate line of the plurality of gate lines.

20. The display device of claim 16, further comprising:
   a plurality of sensor electrodes, each sensor electrode comprising at least one display electrode configured for capacitive sensing and display updating;
   a plurality of routing traces coupled to the plurality of sensor electrodes, the plurality of routing traces disposed between source lines of the plurality source lines; and
   sensor circuitry coupled to the plurality of routing traces and configured to drive the plurality of sensor electrodes for capacitive sensing.

* * * * *

UNITED STATES PATENT AND TRADEMARK OFFICE
CERTIFICATE OF CORRECTION

PATENT NO. : 10,504,463 B2
APPLICATION NO. : 15/916030
DATED : December 10, 2019
INVENTOR(S) : Stephen L. Morein Page 1 of 1

It is certified that error appears in the above-identified patent and that said Letters Patent is hereby corrected as shown below:

In the Claims

In Column 18, Line 9, in Claim 17, after "select" delete "a first".

In Column 18, Line 10, in Claim 17, after "subpixel" insert -- of --.

Signed and Sealed this
Twenty-fourth Day of November, 2020

Andrei Iancu
*Director of the United States Patent and Trademark Office*